United States Patent
Doczy et al.

(10) Patent No.: US 7,429,954 B2
(45) Date of Patent: Sep. 30, 2008

(54) DISPLAY PANEL WITH PAIRS OF ANTENNAS

(75) Inventors: Paul J. Doczy, Cypress, TX (US); Earl W. Moore, Cypress, TX (US); Stacy L. Wolff, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 63 days.

(21) Appl. No.: 11/229,192

(22) Filed: Sep. 16, 2005

(65) Prior Publication Data

US 2007/0063900 A1  Mar. 22, 2007

(51) Int. Cl.
*H01Q 1/24* (2006.01)

(52) U.S. Cl. ...................................... 343/702
(58) Field of Classification Search ................. 343/702, 343/906

See application file for complete search history.

(56) References Cited

U.S. PATENT DOCUMENTS

| | | | |
|---|---|---|---|
| 5,373,300 A * | 12/1994 | Jenness et al. ............... | 343/702 |
| 5,867,131 A * | 2/1999 | Camp et al. .................. | 343/797 |
| 6,285,328 B1 | 9/2001 | Masaki et al. | |
| 6,339,400 B1 | 1/2002 | Flint et al. | |
| 6,509,877 B2 | 1/2003 | Masaki | |
| 6,636,181 B2 | 10/2003 | Asano et al. | |
| 6,788,529 B2 | 9/2004 | Homer et al. | |
| 6,809,690 B2 | 10/2004 | Tao | |
| 2006/0007649 A1* | 1/2006 | Yang .......................... | 361/683 |
| 2006/0109184 A1* | 5/2006 | Chen et al. .................. | 343/702 |

\* cited by examiner

*Primary Examiner*—Tho G Phan

(57) ABSTRACT

A portable computer display panel comprising a first and second pair of antennas disposed within a housing. A display screen is supported by the housing. A latch assembly is disposed between the display screen and an outer edge of the housing. The first pair of antennas is disposed within said housing between the display screen and the outer edge of said housing. The second pair of antennas is disposed within said housing between said display screen and the outer edge of said housing.

1 Claim, 2 Drawing Sheets

DISPLAY PANEL WITH PAIRS OF ANTENNAS

BACKGROUND

Several types of wireless communication systems are available for use with portable computer systems. These systems include local area networks (LAN) that operate within a small area, such as a single building, and wide area networks (WAN) that operate over a large area, such as a metropolitan area. These different types of systems utilize distinct signals. In order to utilize both LAN and WAN networks, a portable computer system must be able to transmit and receive the signals for both types of networks. The antennas required for transmitting and receiving signals for one type of network are often not suitable for use with other types of networks. Therefore, portable computer systems that are designed to operate on WAN, LAN, and other wireless networks need to have multiple antennas.

In portable computer systems, such as notebook computer systems, placement of multiple wireless network antennas is complicated by the need for compact and efficient packaging. Thus, portable computer systems utilize externally-mounted wireless network antennas due to limited space available within the system chassis for the placement of multiple wireless network antennas.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections.

DETAILED DESCRIPTION

Figure 1:
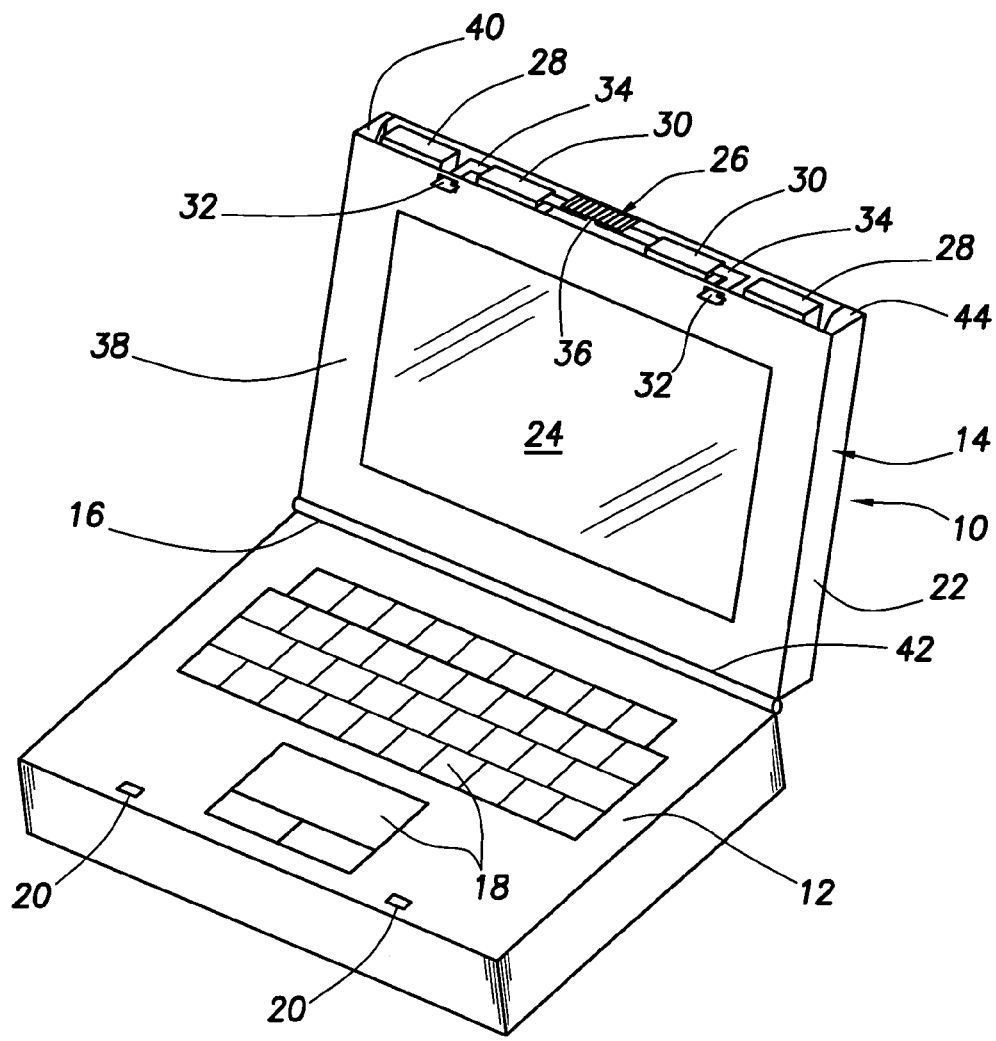
FIG. 1 shows a partial cut-away view of an embodiment of open portable computer assembly.

Referring now to FIG. 1, a portable computer 10 comprises main body 12 and display panel 14 connected by hinge 16. Main body 12 comprises input devices 18, such as a keyboard and touch pad, and latch receivers 20. Display panel 14 comprises housing 22, display screen 24, latch assembly 26, first antenna pair 28, and second antenna pair 30. In FIG. 1, the upper surface of display panel 14 is removed so that latch assembly 26, first antenna pair 28, and second antenna pair 30 can be more easily seen. Latch assembly 26, which may be better seen in FIG. 3, comprises engagement members 32, body 34, and slider 36. Housing 22 comprises front surface 38, outer surface 40, hinged edge 42, and outer edge 44.

Display screen 24 is supported by housing 22 so that space is available between the screen and the outer edges of the housing. Housing 22 is connected to main body 12 at hinged edge 42. Latch assembly 26 is disposed between display screen 24 and outer edge 44 of housing 22. Engagement members 32 project through front surface 38 of housing 22. Slider 36 projects through outer surface 40 of housing 22.

FIG. 1 illustrates portable computer 10 in an open position where a portion of outer edge 44 of housing 42 has been removed so that latch assembly 26 and antenna pairs 28 and 30 can be seen. Antenna pairs 28 and 30 are both disposed inside housing 22 between display screen 24 and outer edge 44. First antenna pair 28 is disposed outboard of latch assembly 26. Second antenna pair 30 is disposed between engagement members 32 and in close proximity to body 34 of latch assembly 26.

In certain embodiments, first antenna pair 28 is a LAN antenna and second antenna pair 30 is a WAN antenna. Thus, computer system 10 can provide wireless communication on two networks without any external antenna. In notebook computer systems, the area between screen 24 and outer edge 44 may offer the most beneficial location for antenna pairs 28, 30 as this portion of a notebook computer system may be at the highest elevation during normal use. In certain embodiments, only one antenna from each of first antenna pair 28 and second antenna pair 30 may be utilized in a single system and the other antenna of each pair can be omitted from the system so as to provide room for other components.

Figure 2:
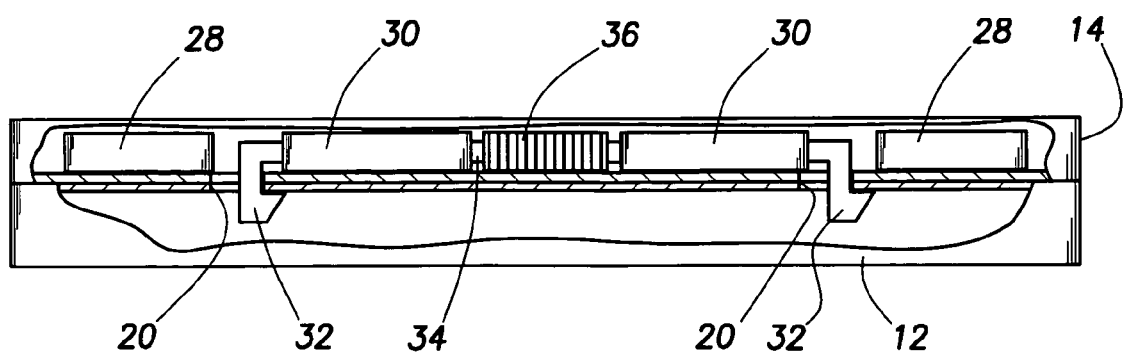
FIG. 2 shows a partial cut-away view of an embodiment of a closed portable computer assembly.

Referring now to FIG. 2, portable computer 10 is shown in a closed and latched position where front surface 38 is disposed against main body 12. Engagement members 32 of latch assembly 26 are engaged with latch receivers 20 so as to maintain computer 10 in the closed position. Latch assembly 26 is disengaged by engaging slider 36 so as to move the assembly laterally and disengage engagement members 32 and receivers 20. Therefore, second antenna pair 30 allows sufficient lateral movement of latch assembly 26 so that engagement members 32 can disengage.

In many applications, because of the size of both the antenna and the latch assembly, at least a portion of the antenna may overlap with the latch body. In order to prevent interference with the performance of the antenna, latch body 34 may be constructed from plastic, or some other non-metallic material. Second antenna pair 30 can have a variety of shapes and configurations that provide acceptable performance while not interfering with the operation of latch assembly 26.

Figure 3:
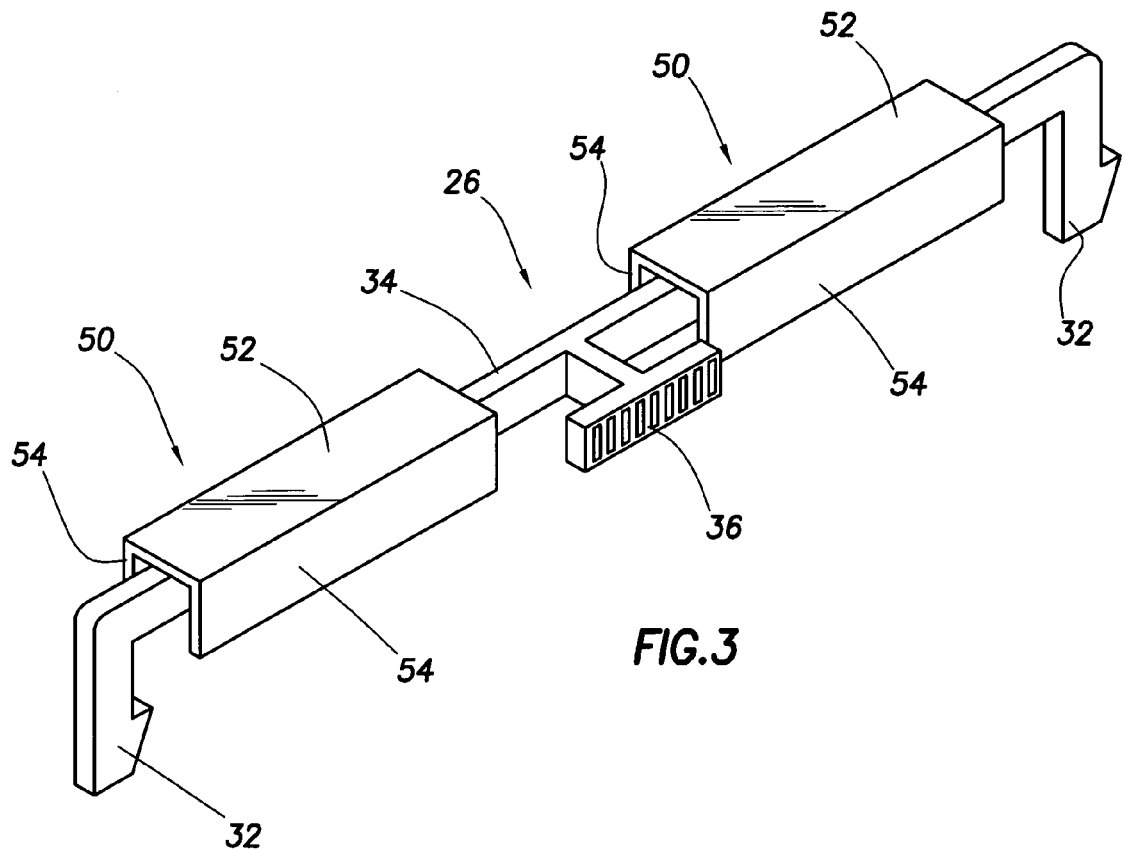
FIG. 3 shows an embodiment of a latch and antenna configuration.
Figure 4:
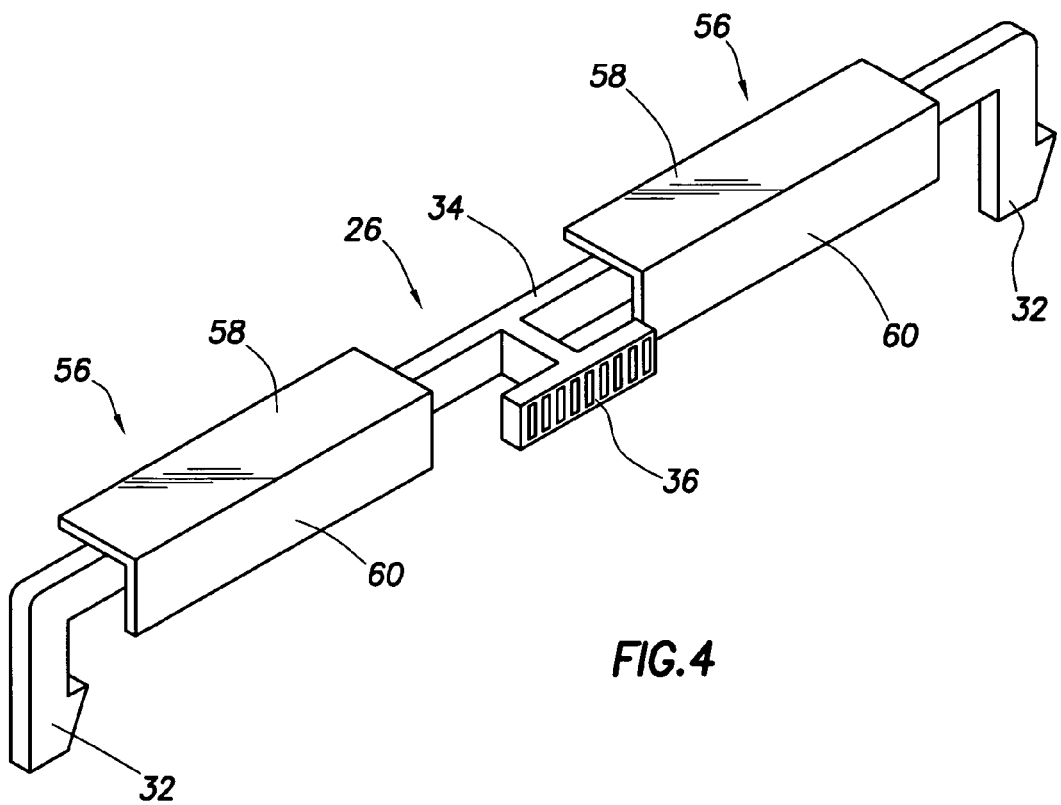
FIG. 4 shows an embodiment of a latch and antenna configuration.

For example, FIG. 3 shows a pair of U-shaped antennas 50 comprising base portion 52 and two opposing leg portions 54. Latch body 34 is disposed between leg portions 54 but can move freely relative to antenna 50. FIG. 4 illustrates a pair of L-shaped antennas 56 comprising base portion 58 and leg 60. Leg 60 overlaps a portion of latch body 34. A flat antenna, that does not overlap latch body 34, may also be used as second antenna pair 30 in certain applications.

The above discussion is meant to be illustrative of the principles and various embodiments of the present invention. Numerous variations and modifications will become apparent to those skilled in the art once the above disclosure is fully appreciated. For example, various latch assemblies and configurations may be used in cooperation with antenna arranged as described herein. It is intended that the following claims be interpreted to embrace all such variations and modifications.

What is claimed is:

1. An antenna system comprising: a pair of local area network antennas disposed within a display panel and between an outer edge of the display panel and a display screen mounted within the display panel; and a pair of wide area network antennas disposed within the display panel and between the outer edge of the display panel and the display screen mounted within the display panel; wherein a latch assembly is also disposed between the outer edge of the display panel and the display screen mounted to the display panel; wherein the latch assembly comprises a pair of engagement members that extend through a front surface of the display panel; and wherein at least one of said antennas is disposed on the latch assembly and between the pair of engagement members.

* * * * *